United States Patent [19]

Shin et al.

[11] Patent Number: 5,734,512
[45] Date of Patent: Mar. 31, 1998

[54] DUAL-FOCUS OBJECTIVE LENS OF OPTICAL PICKUP

[75] Inventors: Dong-ho Shin; Chul-woo Lee; Kyung-hwa Rim, all of Seoul, Rep. of Korea

[73] Assignee: Samsung Electronics Co., Ltd., Suwon, Rep. of Korea

[21] Appl. No.: 587,786

[22] Filed: Dec. 26, 1995

[30] Foreign Application Priority Data

Jun. 7, 1995 [KR] Rep. of Korea .................... 95 14927

[51] Int. Cl.[6] ............................ G02B 3/10; G02B 27/14; G02B 3/02
[52] U.S. Cl. .................. 359/721; 359/637; 359/717; 359/719
[58] Field of Search ........................ 359/637, 717, 359/719, 721

[56] References Cited

U.S. PATENT DOCUMENTS

| | | | |
|---|---|---|---|
| 1,616,765 | 2/1927 | Sonnefeld | 359/716 |
| 2,642,488 | 6/1953 | Epstein | 359/716 |
| 2,685,821 | 8/1954 | Tillyer et al. | 359/716 |
| 3,594,066 | 7/1971 | Cook | 359/684 |
| 3,762,801 | 10/1973 | Baker | 359/716 |
| 4,577,941 | 3/1986 | Kubota | 359/637 |

FOREIGN PATENT DOCUMENTS

| | | | |
|---|---|---|---|
| 62-124662 | 6/1987 | Japan . | |
| 63-8701 | 1/1988 | Japan | 359/717 |
| 63-236006 | 9/1988 | Japan | 359/721 |
| 3-2812 | 1/1991 | Japan | 359/637 |

OTHER PUBLICATIONS

Y. Komma et al., "Dual focus optical head for 0.6mm and 1.2mm disks," 288/SPIE, vol. 2338, *Optical Data Storage* (1994), pp. 282–287.

*Primary Examiner*—David C. Nelms
*Assistant Examiner*—Evelyn A. Lester
*Attorney, Agent, or Firm*—Burns, Doane, Swecker & Mathis, L.L.P.

[57] ABSTRACT

A dual-focus objective lens for an optical pickup which is compatible with both 0.6 mm and 1.2 mm disks is compensated in its aberration with respect to a light spot on a recording plane of the loaded disk and is composed of a first lens and a second lens. The loaded positions of the 0.6 mm disk and 1.2 mm disk in view of the second lens are different from each other. An optical pickup having the dual-focus objective lens can reproduce a signal with a high signal-to-noise ratio and has improved light efficiency. Also, an optical pickup enabling recording as well as reproduction is obtained.

2 Claims, 6 Drawing Sheets

DUAL-FOCUS OBJECTIVE LENS OF OPTICAL PICKUP

Background of the Invention

The present invention relates to an objective lens of an optical pickup for recording or reproducing information optically using disks having different thicknesses, and more particularly, to a dual-focus objective lens for an optical pickup, in which aberration for each optical focus on the recording planes of the disks having different thicknesses is compensated.

As an optical recording medium, a well-known compact disk has a substrate thickness of 1.2 mm, with 0.6 mm disks having been recently developed for high-density recording. In order to read the information stored at high density, the size of a focused optical spot should be reduced. For this purpose, it is necessary to use a short-wavelength light source and an objective lens having a large numerical aperture.

However, since an objective lens having a large numerical aperture is extremely unstable, causing aberration when the disk is tilted, the disk's slope must be tightly controlled during reproduction. This aberration increases in proportion to the thickness and slope of the disk substrate. Therefore, a slope error tolerance can be increased by making the substrate as thin as possible, thereby realizing practical high-density reproduction. With the advent of disks of varying thickness, compatible optical pickup is required for the various kinds (different thicknesses) of disks. FIG. 1 shows a conventional dual-focus optical pickup for 0.6 mm disks and 1.2 mm disks, by which spherical aberration caused by different disk thicknesses is compensated for. Here, a reference numeral 1 is a 0.6 mm disk and reference numeral 2 is a 1.2 mm disk, with one or the other disk being loaded into a disk drive (not shown).

Referring to FIG. 1, a conventional dual-focus optical pickup is constituted by a laser diode 3 for generating a laser light beam, a half mirror 4 for partially reflecting and partially transmitting the light beam, a collimating lens 5 for directing the reflected light beam from half mirror 4 as a collimated light toward the loaded disk 1 or 2, a hologram lens 6 for diffracting the collimated light, and an objective lens 9 for focusing the zero-order transmitted light beam 7 and 1st-order diffracted light beam 8 of hologram lens 6 onto disks 1 and 2, respectively. Also, a sensor lens 10 is provided for receiving the information-bearing reflected light of disk 1 or disk 2, to be detected by a photo-detector 11.

Here, the 0.6 mm disk 1 is read using the zero-order transmitted light beam 7, as shown in FIG. 2, and the 1.2 mm disk 2 is read using the 1st-order diffracted light beam 8, as shown in FIG. 3. Hologram lens 6 is blazed to diffract either the +1 st-order diffracted light beam or the 1 st-order diffracted light beam in order to prevent the lowering of the light efficiency.

However, in the dual-focus optical pickup having the aforementioned hologram lens, the incident light is divided into zero-order light and 1st-order diffracted light, one being used to read a signal from the loaded disk. Thus, light efficiency is very low and the signal-to-noise ratio of the reproduced signal is reduced. Moreover, since another light spot having a different focal plane is landed on the loaded disk simultaneously, recording is very difficult due to the light interference of the other light spot. Also, since the light is reflected from the two spots, each being received by the photo-detector and thus causing interference, it is difficult to obtain a clean reproduced signal and to detect a focal signal exactly.

SUMMARY OF THE INVENTION

To solve the above problems, it is therefore an object of the present invention to provide a dual-focus objective lens of an optical pickup, for focusing a single incident light onto disks having different thicknesses without diffracting the light.

To accomplish the above object, there is provided a dual-focus objective lens for an optical pickup for focusing an incident light to form respective light spots onto disks having different thicknesses, the objective lens comprising: at least a first lens and a second lens in which the aberrations of the disks having different thicknesses are compensated.

BRIEF DESCRIPTION OF THE DRAWINGS

The above objects and advantages of the present invention will become more apparent by describing in detail a preferred embodiment thereof with reference to the attached drawings in which:

FIGS. 7 and 8 are modulation transfer function curves of light spots for each disk type, in which FIG. 7 is for a 0.6 mm disk and FIG. 8 is for a 1.2 mm disk.

DETAILED DESCRIPTION OF THE INVENTION

Figure 1:
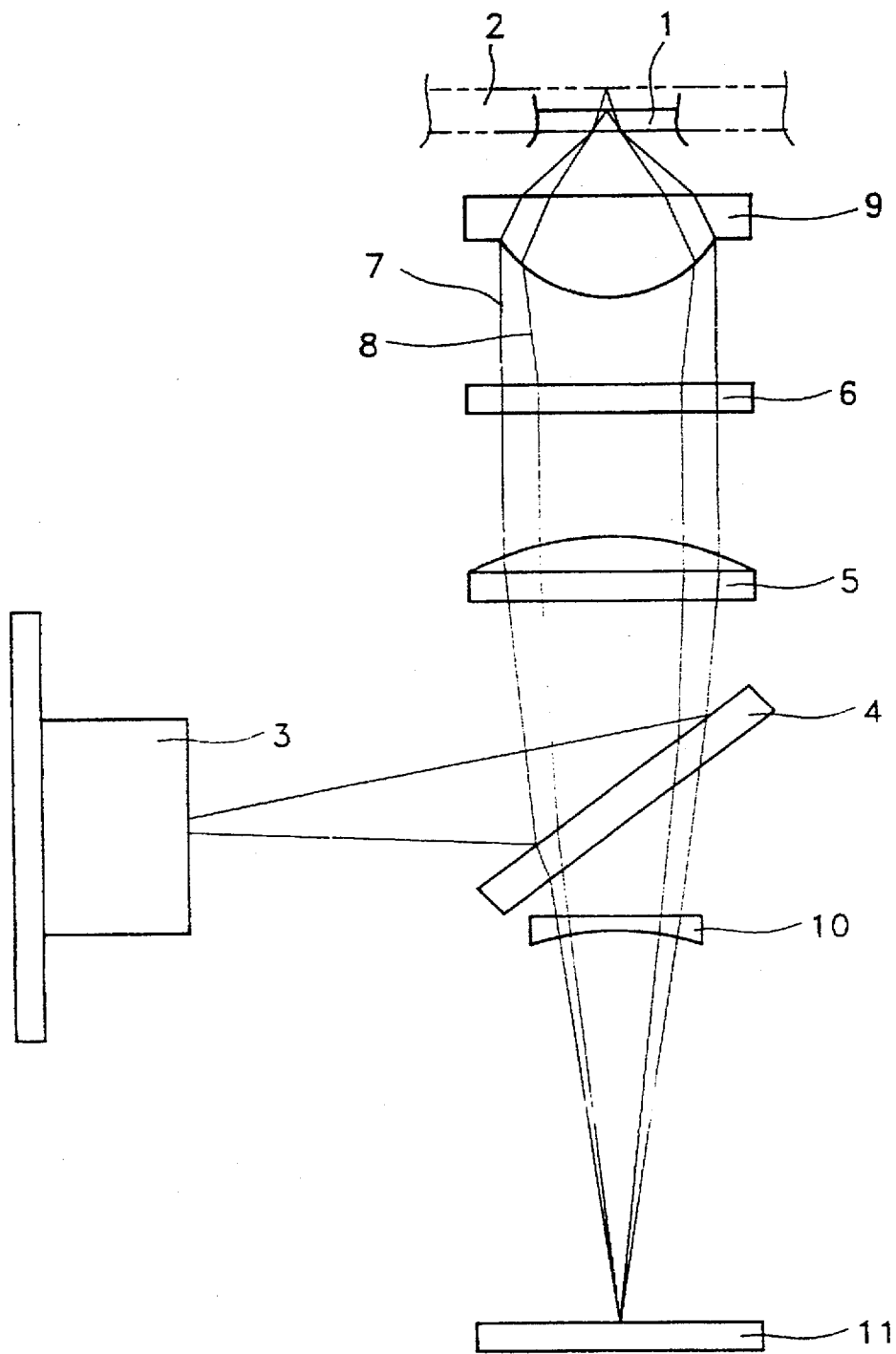
FIG. 1 is a schematic view showing the construction of a conventional dual-focus optical pickup.
Figure 2:
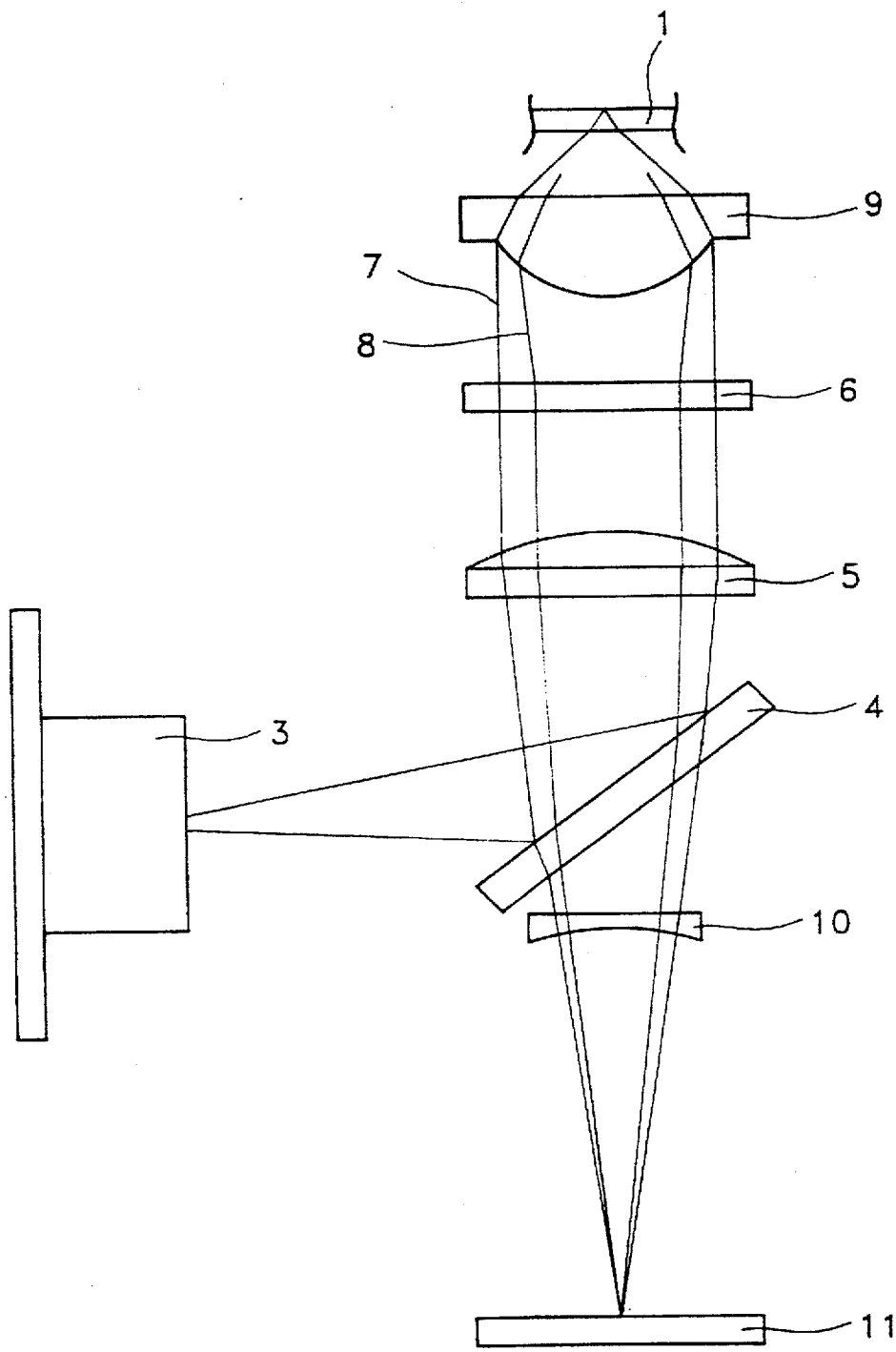
FIG. 2 shows the optical path for a 0.6 mm disk in the conventional dual-focus optical pickup.
Figure 3:
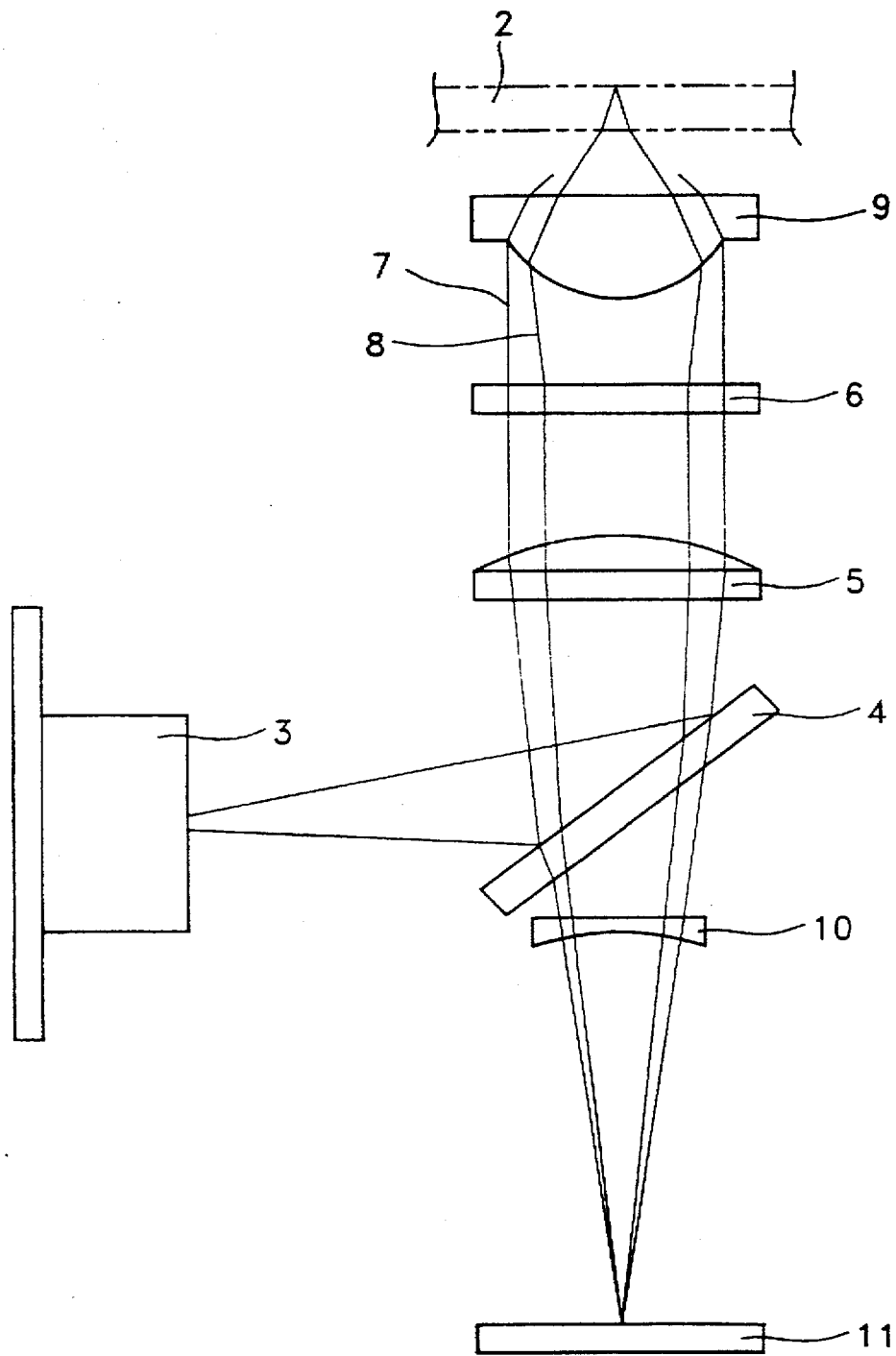
FIG. 3 shows the optical path for a 1.2 mm disk in the conventional dual-focus optical pickup.
Figure 4:
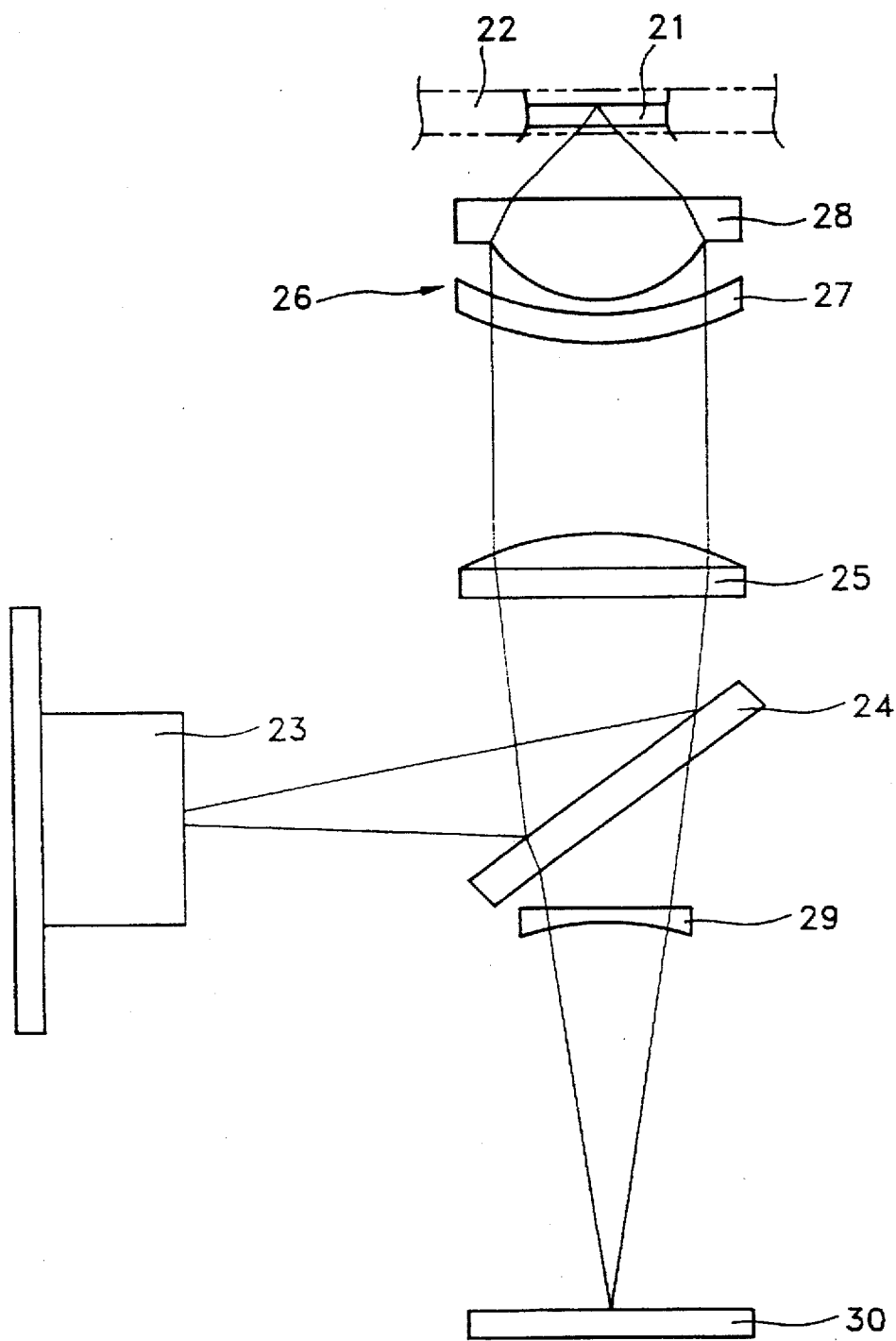
FIG. 4 is a schematic view showing the construction of an optical pickup having a dual-focus objective lens according to the present invention.

In FIG. 4, a reference numeral 23 is a laser diode for generating a laser light beam, reference numeral 24 is a half mirror for partially reflecting and partially transmitting the generated light beam, reference numeral 25 is a collimating lens for making the reflected light beam from half mirror 24 parallel and directing it toward a disk 21 or 22, reference numeral 26 is an objective lens formed of a combination of a first lens 27 and a second lens 28, so as to form a light spot on disk 21 or 22 from the collimated light from collimating lens 25, and reference numerals 29 and 30 are a sensor lens and a photo-detector disposed for detecting a signal from the reflected light of disk 21 or 22. Here, the thinner disk 21 is a 0.6 mm disk and the thicker disk 22 is a 1.2 mm disk, either being installed within a drive (not shown).

Figure 5:
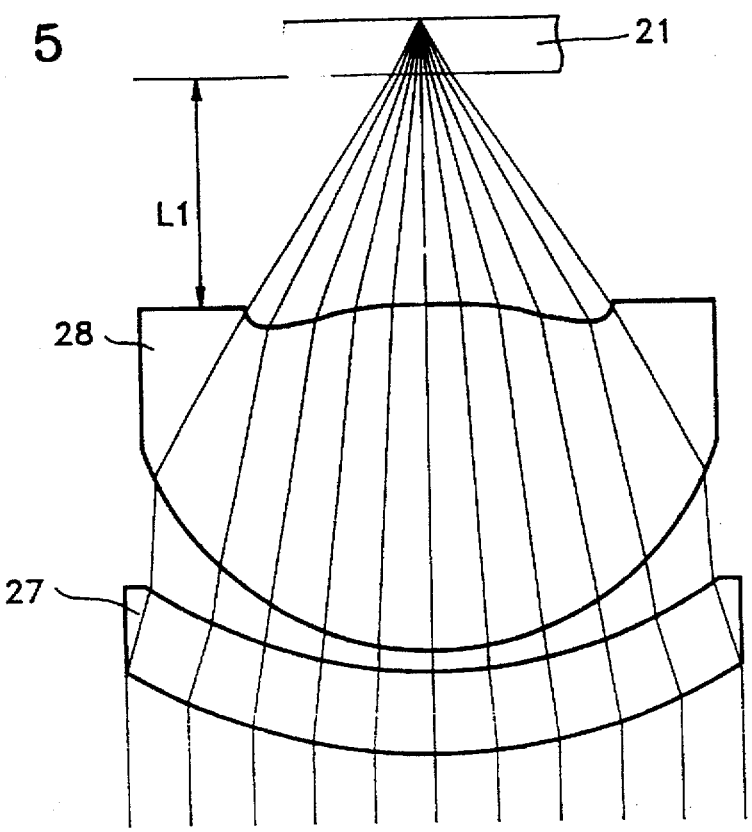
FIG. 5 shows the optical path for a 0.6 mm disk in the optical pickup having a dual-focus objective lens according to the present invention.
Figure 6:
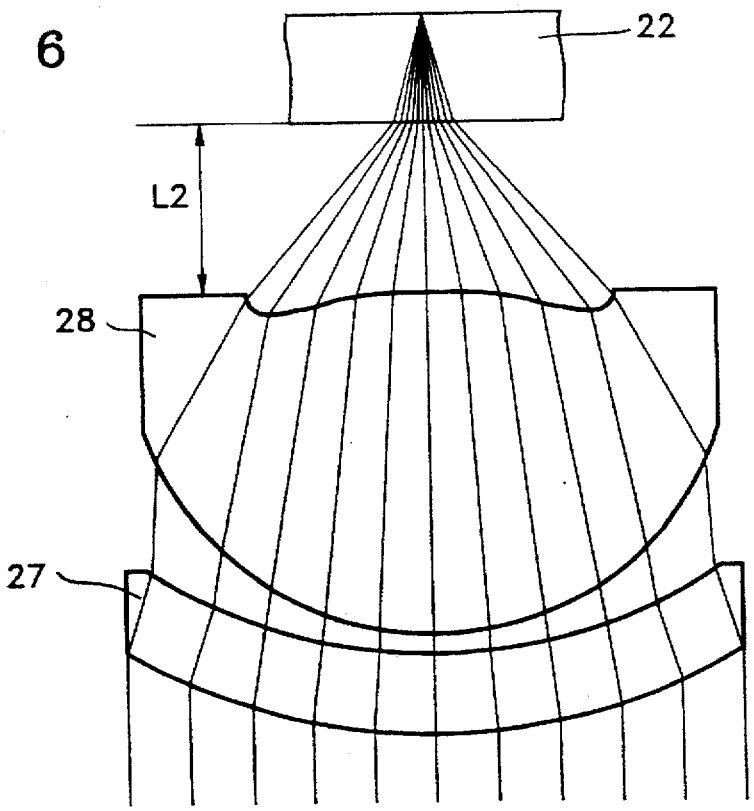
FIG. 6 shows the optical path for a 1.2 mm disk in the optical pickup having a dual-focus objective lens according to the present invention.

First lens 27 and second lens 28 of the dual-focus objective lens according to the present invention compensate aberrations caused by the disk thickness difference so as to form a single light spot onto loaded disk 21 or 22, as shown in FIGS. 5 and 6. The following lens data are required for designing dual-focus objective lens 26 with respect to 0.6 mm and 1.2 mm disks the refractive indexes of which are both 1.51.

criteria for first lens 27
    thickness at center: 1 mm
    refractive index: 1.51– curvature radius of the light-receiving plane: 5.28 mm aspherical surface coefficients of the light-receiving plane: $0.27e^{-4}$, $0.64e^{-5}$, $0.66e^{-6}$ and $0.66e^{-7}$ curvature radius of the light-emitting plane: 5.28 mm aspherical surface coefficients of the light-emitting plane: $0.17e^{-3}$, $-0.90e^{-5}$, $-0.72e^{-6}$ and $-0.13e^{-8}$ criteria for second lens 28 thickness at center: 3.5 mm curvature radius of the light-receiving plane: 3.0 mm aspherical surface coefficients of the light-receiving plane: $-0.62e^{-2}$, $-0.58e^{-2}$, $0.32e^{-3}$ and $-0.23e^{-4}$ curvature radius of the light-emitting plane: −4.42 mm aspherical surface coefficients of the light-emitting plane: $-0.26e^{-2}$, $-0.13e^{-1}$, $-0.24e^{-2}$ and $0.76e^{-3}$ Further, in the present invention, the distance between the optical axes of first lens 27 and second lens 28 is 0.25 mm, and the second lens is positioned 2 mm (L1) from a loaded 0.6 mm disk and 1.607 mm (L2) from a loaded 1.2 mm disk. Here, the effective diameter of incident light is 4.2 mm.

Figure 7:
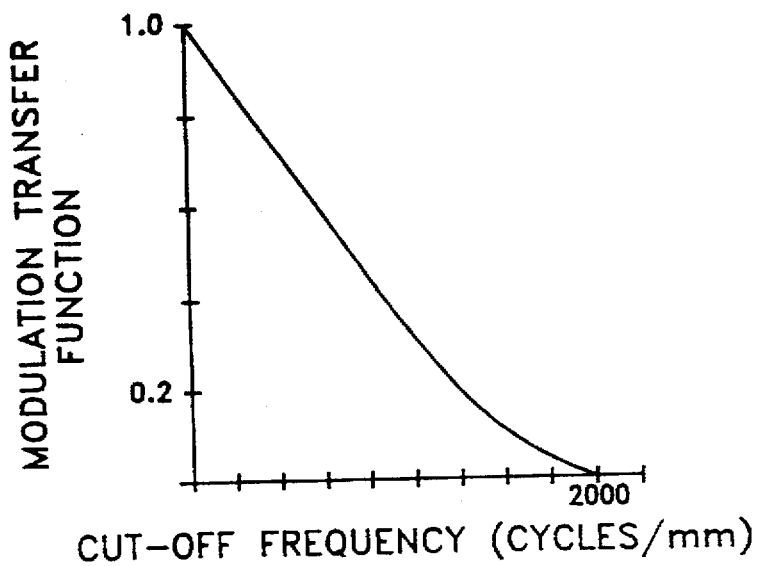
Figure 8:
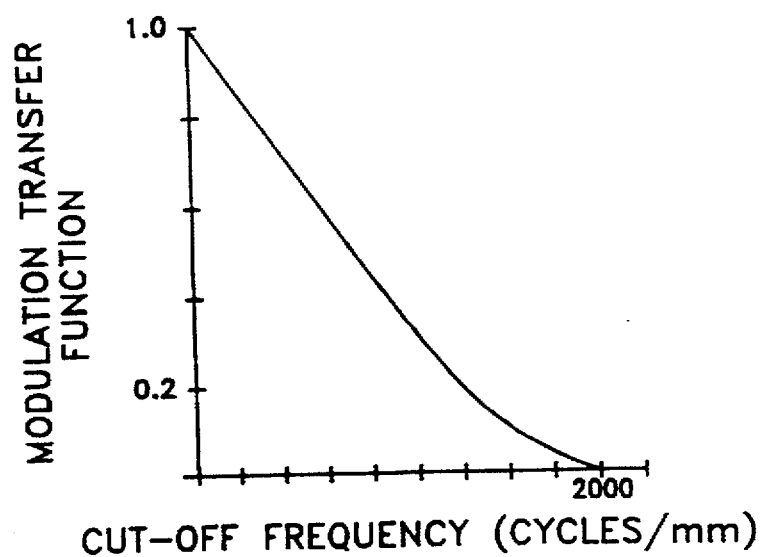

FIGS. 7 and 8 show modulation transfer function curves of light spots for a 0.6 mm disk and a 1.2 mm disk, respectively, according to the objective lens having first lens 27 and second lens 28. In both cases, the cut-off frequency is 2000 cycles per millimeter and the diameter of the light spot is 1 μm.

Of course, the dual-focus objective lens according to the present invention may comprise many more lens members than just first and second lenses.

As described above, the present invention provides a dual-focus objective lens for forming a light spot onto disks having different thicknesses so that an optical pickup for disks having different thicknesses can be attained without using a diffractive optical device as in the conventional hologram lens. Since the light is not divided for disks having different thicknesses, the present invention is effective in improving light efficiency and the signal-to-noise ratio of a reproduced signal. In particular, since a single incident light beam is utilized, an optical pickup enabling recording as well as reproduction is obtained.

What is claimed is:

1. An objective lens for an optical pickup for focusing incident light onto disks having different thicknesses, said lens comprising:

at last a first lens and a second lens in which the aberrations due to said disks having different thicknesses are compensated, wherein the effective diameter of the incident light is 4.2 mm, said first lens has a center thickness of 1 mm, a refractive index of 1.51, a light-receiving-plane curvature radius of 5.28 mm, light-receiving-plane spherical surface coefficients of $0.27e^{-4}$, $0.64e^{-5}$, $0.66e^{-6}$, $0.66e^{-7}$ a light-emitting-plane curvature radius of 5.28 mm, light-emitting-plane aspherical surface coefficients of $0.17e^{-3}$, $-0.90e^{-5}$, $-0.72e^{-6}$ and $-0.13e^{-8}$, and said second lens has a center thickness of 3.5 mm, a light-receiving-plane curvature radius of 3.0 mm, light-receiving-plane aspherical surface coefficients of $-0.62e^{-2}$, $-0.58e^{-2}$, $0.32e^{-3}$ and $-0.23e^{-1}$, a light-emitting-plane curvature radius of −4.42 mm, light-emitting-plane aspherical surface coefficients of $-0.26e^{-2}0.13e^{-1}$, $-0.24e^{-2}$and $0.76e^{-3}$, and wherein the distance between the optical axes of said lens is 0.25 mm and said second lens is disposed so as to be positioned 2 mm from a loaded 0.6 mm disk and 1.607 mm from a loaded 1.2 mm disk.

2. An objection lens for an optical pickup focusing an incident light to form light spots onto disks having different thicknesses, said lens comprising:

at least a first lens and a second lens in which the aberrations due to said disks having different thicknesses are compensated by the lens design of said objective lens wherein said first lens has a refractive index of 1.51, a light-receiving-plane curvature radius of 5.28 mm, light-receiving-plane spherical surface coefficients of $0.27e^{-4}$, $0.64e^{-5}$, $0.66e^{-6}$ and $0.66e^{-7}$, a light-emitting-plane curvature radius of 5.28 mm, light-emitting-plane aspherical surface coefficients of $0.17e^{-3}$, $0.90e^{-5}$, $0.72e^{-6}$ and $0.13e^{-8}$, and said second lens has a light-receiving-plane curvature radius of 3.0 mm, light-receiving-plane aspherical surface coefficients of $0.62e^{-2}$, $0.58e^{-2}$, $0.32e^{-3}$and $-0.23e^{-4}$, a light-emitting-plane curvature radius of −4.42 mm, light-emitting-plane aspherical surface coefficients of $-0.26e^{-2}0.13e^{-1}$, $-0.24e^{-2}$ and $0.76e^{-3}$.

* * * * *